(12) United States Patent
DeGroff et al.

(10) Patent No.: US 7,074,010 B2
(45) Date of Patent: Jul. 11, 2006

(54) RAM AIR TURBINE OVER-SPEED PROTECTOR USING REDUNDANT YOKE PLATE LINEAR BEARINGS

(75) Inventors: William T. DeGroff, Rockford, IL (US); Harry R. Carter, Jr., Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 142 days.

(21) Appl. No.: 10/964,475

(22) Filed: Oct. 12, 2004

(65) Prior Publication Data

US 2006/0078430 A1    Apr. 13, 2006

(51) Int. Cl.
*B64C 11/32* (2006.01)
*F03D 7/04* (2006.01)

(52) U.S. Cl. .................. 416/46; 416/52; 416/157 R

(58) Field of Classification Search ............... 416/44, 416/46, 51, 52, 53, 156, 157 R
See application file for complete search history.

(56) References Cited

U.S. PATENT DOCUMENTS

| 4,411,596 A | * | 10/1983 | Chilman ................. 416/51 |
| 4,743,163 A | * | 5/1988 | Markunas et al. ........... 416/44 |
| 6,196,801 B1 | * | 3/2001 | Muhlbauer .............. 416/157 R |

* cited by examiner

*Primary Examiner*—Edward K. Look
*Assistant Examiner*—Dwayne J White
(74) *Attorney, Agent, or Firm*—Stephen G. Mican

(57) ABSTRACT

An improved ram air turbine for generating emergency aeronautical supplemental power with a plurality of concentric or nested linear bearings for supporting a speed governor yoke plate on a speed governor shaft comprising a movable sleeve that supports the yoke plate and rides on the governor shaft.

15 Claims, 1 Drawing Sheet

RAM AIR TURBINE OVER-SPEED PROTECTOR USING REDUNDANT YOKE PLATE LINEAR BEARINGS

FIELD OF THE INVENTION

The invention relates to emergency supplemental power supplies for aeronautical applications, and more particularly to an improved ram air turbine for generating emergency supplemental power for aircraft in flight.

BACKGROUND OF THE INVENTION

A ram air turbine (RAT) is a device for generating emergency supplemental power in a wide variety of aircraft. A RAT may generate hydraulic power, electric power or both. A RAT incorporates a turbine that extracts power from an air stream proximate the aircraft in flight. A typical RAT in current use is described in U.S. Pat. No. 4,743,163 to Markunas et al., owned by the assignee of this application, and incorporated herein by reference. The turbine is coupled to suitable power generating equipment, such as a hydraulic pump for hydraulic power and an electric generator for electric power.

As described in Markunas et al., the turbine includes a speed governor that changes the turbine blade position to maintain a relatively constant shaft speed to the power generating equipment. Failure of the turbine speed governor can cause an over-speed condition that may ultimately cause the release of a turbine blade at very high speed. Due to the high speed, the wayward blade has very high energy as well. The most common cause of governor failure is due to seizure of the bearing between the governor shaft and the governor yoke plate that controls the pitch of the turbine blades.

The potential release of a high energy blade proximate the aircraft is a concern for both commercial and military RAT applications. Should the wayward blade strike the aircraft fuselage, it may penetrate the skin and cause damage to electric or hydraulic power equipment or control systems. It may also injure passengers or crew. If one of the propulsion engines ingests the wayward blade, the engine may suffer severe damage that results in loss of thrust.

Current methods to minimise hazards caused by turbine over-speed-induced release of a turbine blade have involved strategic placement of key elements or shields to prevent penetration. These methods no longer satisfy increasingly stringent certification and safety requirements promoted by airworthiness authorities.

SUMMARY OF THE INVENTION

The invention comprises an improved ram air turbine (RAT) for generating emergency aeronautical supplemental power with a plurality concentric or nested linear bearings for slidingly supporting a speed governor yoke plate on a speed governor shaft.

In a preferred embodiment, the invention comprises an improved RAT for generating emergency aeronautical supplemental power that has a mechanical governor for automatically adjusting the pitch of turbine blades attached to a turbine hub for the RAT, comprising: a governor shaft within the RAT that has an axis of rotation; a yoke plate for adjusting the pitch of the turbine blades as it travels axially with respect to the axis of rotation; and a plurality of concentric linear bearings that slidingly support the yoke plate on the governor shaft.

DETAILED DESCRIPTION OF THE INVENTION

Figure 1:
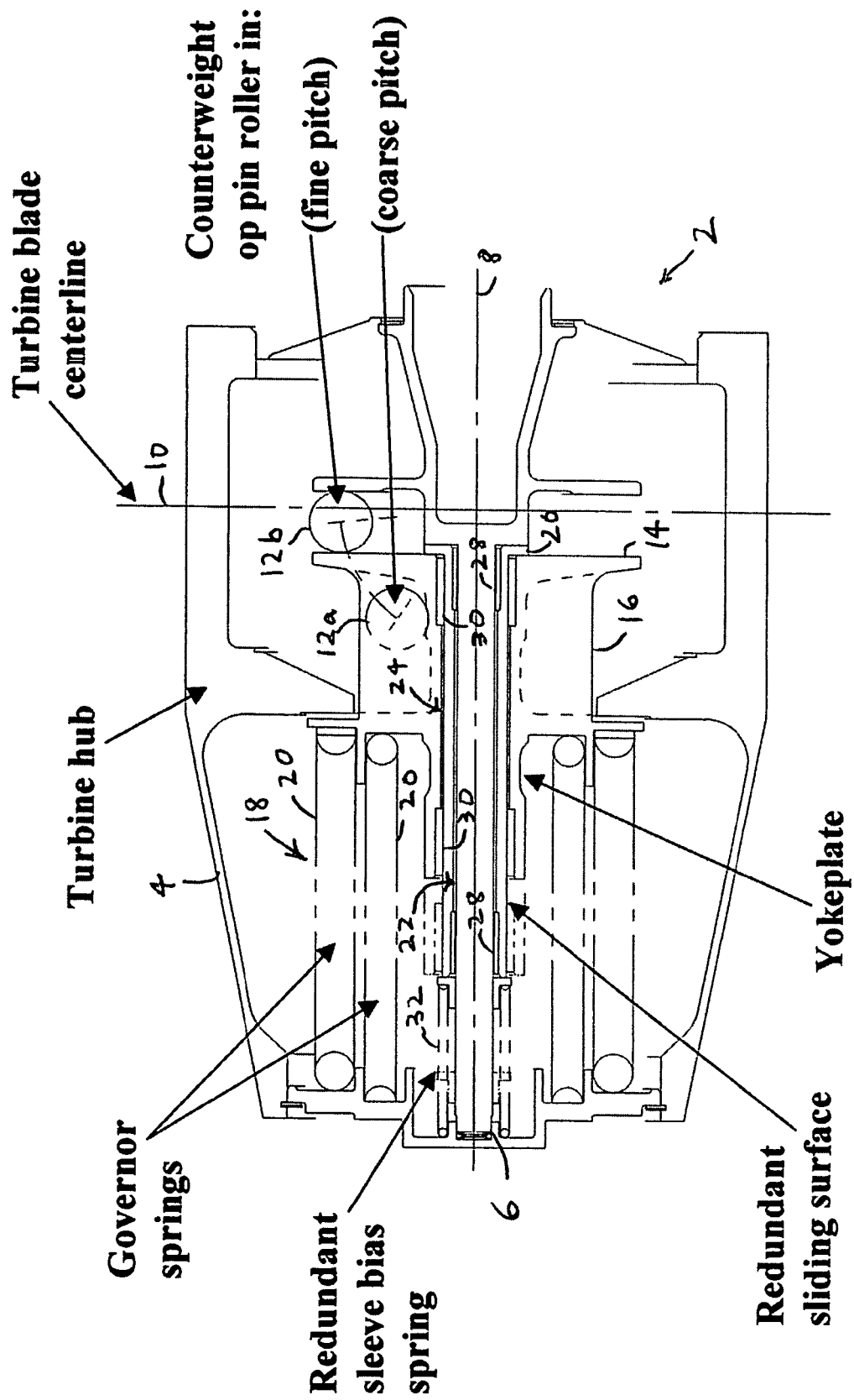
FIG. 1 is a cut-away side view of a portion of a ram air turbine according to a preferred embodiment of the invention.

As described in Markunas et al., during normal operation RAT speed is controlled with a counterweight/spring governor balance system. As speed increases the centrifugal torque of a blade/counterweight assembly increases. This torque acts through a cam follower and yoke plate slidingly supported by a governor shaft to compress a helical spring and thus change the position of the yoke plate. The yoke plate engages pins coupled to the blades that move the blades to a coarser angle with movement of the yoke plate and thus extract less power from the airstreams. In this way, the turbine speed is controlled over a range of airspeeds, altitudes and loads.

Such a mechanical governor system requires a translation of rotary motion about the axis of the governor shaft due to the blade/counterweight assembly turning about the blade pitch change axis to axial motion along the turbine/governor shaft such that the force balance with the helical spring can be affected. The translation occurs by means of a roller bearing on the counterweight assembly that engages a bearing surface on the yoke plate. The yoke plate in turn engages the governor shaft with a linear bearing to slide along the governor shaft, so that low-friction translation is obtained. Unfortunately, seizure of this linear bearing sometimes occurs and such seizure tends to lock the blades at or near the fine pitch position. In this position, the turbine is most susceptible to over-speed. The invention dramatically reduces the likelihood of linear bearing seizure on the governor shaft.

FIG. 1 is a cut-away side view of a portion of a RAT 2 according to a preferred embodiment of the invention. A turbine hub 4 for the RAT 2 has a governor shaft 6 with a governor shaft axis of rotation 8 generally perpendicular to a turbine blade pitch axis of rotation 10. Relative to the governor axis 8, rotary motion of turbine blades (not shown) attached to the turbine hub 4 translates to axial motion through a counterweight assembly (not shown) by means of a counterweight contact roller bearing or op pin roller 12, shown in both the fine and coarse pitch blade positions as 12a and 12b, respectively. The op pin roller 12 engages a bearing surface 14 of a governor yoke plate 16 to cause a corresponding axial motion of the yoke plate 16 as the op pin roller 12 moves between the fine and coarse pitch blade positions. As the yoke plate 16 moves axially in response to the change of position of the op pin roller 12, the yoke plate 16 compresses a governor spring assembly 18. The yoke plate 16 changes pitch of the turbine blades as it moves axially and this brings about a force equilibrium that ultimately controls turbine speed. Although the governor spring assembly 18 comprises two nested helical springs 20 in FIG. 1, any number of helical springs, or alternatively, other axial spring designs such as disc (Belleville) springs, may be used.

According to the invention, the yoke plate 16 rides along the governor axis 8 upon nested or concentric bearings, shown as first linear bearing 22 and second, redundant linear bearing 24, such that the governor shaft 6 slidingly supports the yoke plate 16.

The first bearing 22 comprises a movable sleeve 26 fitted over the governor shaft 6, preferably with sleeve bushings 28 that slidingly support the sleeve 26 upon the outer diameter of the governor shaft 6. The second bearing 24 comprises the yoke plate 16 fitted over the movable sleeve 26, preferably with yoke plate bushings 30 that slidingly support the yoke plate 16 upon the outer diameter of the movable sleeve 26. In this manner, should the yoke plate 16 seize to the sleeve 26, motion of the yoke plate 16 is still possible, since the sleeve 26 slides upon the governor shaft 6, thereby permitting proper governor action. Similarly, should the sleeve 26 seize to the governor shaft 6, motion of the yoke plate 16 on the sleeve 26 is still possible, thereby permitting proper governor action.

The bushings 28, 30 used within the concentric bearings 22, 24 preferably comprise a robust, low-friction material in RAT applications, such as a composite PTFE-coated resin. Whilst the seizure of a single sliding surface within the concentric bearings 22, 24 using these bushings 28, 30 is considered unlikely, the probability of simultaneous seizure of two sliding surfaces, both utilising these bushings 28, 30, is extremely remote.

A low-rate bias spring 32 preloads the sleeve 26 to a position that ensures that motion of the yoke plate 16 in the direction of coarse pitch is always possible, regardless of whether the sleeve 26 suffers a seizure on the bushings 28, 30. The spring 32 also ensures that the sleeve 26 is not free to "chatter" or move unnecessarily under the influence of vibration or shock loads caused by aircraft operation. The spring rate of the spring 32 is selected to minimise the effect on the governor in the event the yoke plate bushings 30 seize to the outer diameter of the sleeve 26.

Although the preferred embodiment of the invention describes governor shaft 6 supporting the yoke plate 16 with dual concentric linear bearings 22, 24, it shall be apparent to those skilled in the art that additional concentric linear bearings can similarly be added for an even greater degree of robustness, simply by adding additional movable sleeves and bias springs.

Described above is an improved ram air turbine for generating emergency aeronautical supplemental power with a plurality of concentric or nested linear bearings for supporting a speed governor yoke plate on a speed governor shaft comprising a movable sleeve that supports the yoke plate and rides on the governor shaft. It should be understood that this embodiment is only an illustrative implementation of the invention, that the various parts and arrangement thereof may be changed or substituted, and that the invention is only limited by the scope of the attached claims.

What is claimed is:

1. An improved ram air turbine (RAT) for generating emergency aeronautical supplemental power that has a mechanical governor for automatically adjusting the pitch of turbine blades attached to a turbine hub for the RAT, comprising:
   a governor shaft within the RAT that has an axis of rotation;
   a yoke plate for adjusting the pitch of the turbine blades as it travels axially with respect to the axis of rotation; and
   a plurality of concentric linear bearings that slidingly support the yoke plate on the governor shaft.

2. The RAT of claim 1, wherein the plurality of concentric linear bearings comprise a pair of linear bearings.

3. The RAT of claim 2, wherein the pair of linear bearings comprises a movable sleeve fitted between the governor shaft and the yoke plate.

4. The RAT of claim 3, wherein the pair of linear bearings comprises a sleeve bearing that comprises the movable sleeve fitted over the generator shaft and a yoke plate bearing that comprises the yoke plate fitted over the movable sleeve.

5. The RAT of claim 4, wherein the sleeve bearing comprises sleeve bushings for slidingly supporting the sleeve on the generator shaft and the yoke plate bearing comprises yoke plate bushings for slidingly supporting the yoke plate on the sleeve.

6. The RAT of claim 5, further comprising a bias spring for biasing the movable sleeve to a position on the generator shaft that permits the yoke plate to adjust the pitch of the turbine blades in a coarse position.

7. The RAT of claim 5, wherein the sleeve bushings and yoke plate bushings comprise a composite PTFE-coated resin.

8. An improved ram air turbine (RAT) for generating emergency aeronautical supplemental power that has a mechanical governor for automatically adjusting the pitch of turbine blades attached to a turbine hub for the RAT, comprising:
   a governor shaft within the RAT that has an axis of rotation;
   a yoke plate for adjusting the pitch of the turbine blades as it travels axially with respect to the axis of rotation; and
   a pair of concentric linear bearings comprising a movable sleeve fitted between the governor shaft and the yoke plate that slidingly support the yoke plate on the governor shaft.

9. The RAT of claim 8, wherein the pair of linear bearings comprises a sleeve bearing that comprises the movable sleeve fitted over the generator shaft and a yoke plate bearing that comprises the yoke plate fitted over the movable sleeve.

10. The RAT of claim 9, wherein the sleeve bearing comprises sleeve bushings for slidingly supporting the sleeve on the generator shaft and the yoke plate bearing comprises yoke plate bushings for slidingly supporting the yoke plate on the sleeve.

11. The RAT of claim 10, further comprising a bias spring for biasing the movable sleeve to a position on the generator shaft that permits the yoke plate to adjust the pitch of the turbine blades in a coarse position.

12. The RAT of claim 10, wherein the sleeve bushings and yoke plate bushings comprise a composite PTFE-coated resin.

13. An improved ram air turbine (RAT) for generating emergency aeronautical supplemental power that has a mechanical governor for automatically adjusting the pitch of turbine blades attached to a turbine hub for the RAT, comprising:
   a governor shaft within the RAT that has an axis of rotation;
   a yoke plate for adjusting the pitch of the turbine blades as it travels axially with respect to the axis of rotation; and
   a pair of concentric linear bearings comprising a sleeve bearing that comprises the generator shaft slidingly supporting a movable sleeve with sleeve bushings and a yoke plate bearing that comprises the movable sleeve slidingly supporting the yoke plate with yoke plate bushings.

14. The RAT of claim 13, further comprising a bias spring for biasing the movable sleeve to a position on the generator shaft that permits the yoke plate to adjust the pitch of the turbine blades in a coarse position.

15. The RAT of claim 13, wherein the sleeve bushings and yoke plate bushings comprise a composite PTFE-coated resin.

* * * * *